June 12, 1945.   J. JACKSON   2,378,084
NUT CRACKER
Filed Dec. 12, 1942
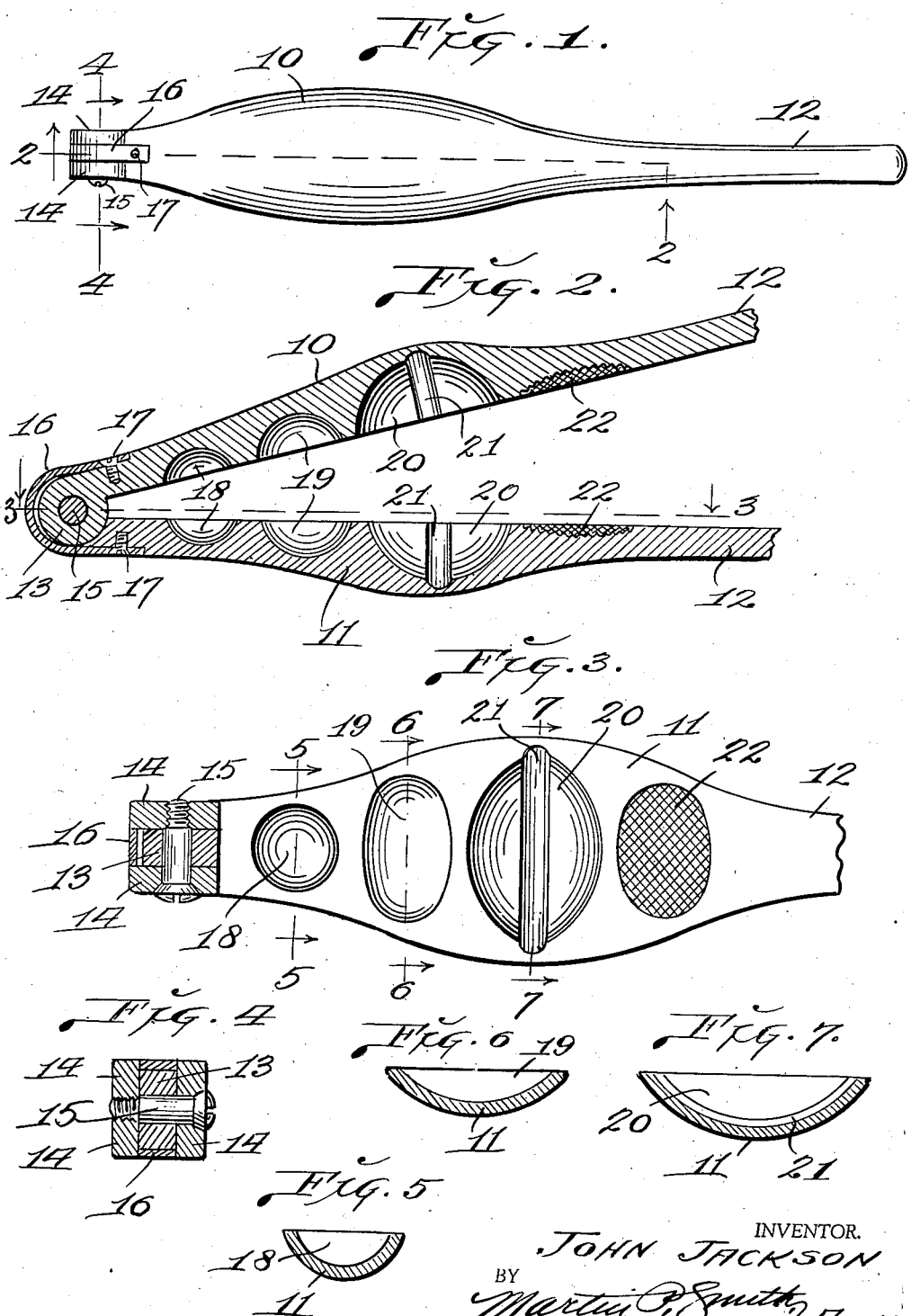
INVENTOR.
JOHN JACKSON
BY Martin P. Smith, ATTY.

Patented June 12, 1945

2,378,084

UNITED STATES PATENT OFFICE 2,378,084

NUTCRACKER

John Jackson, Los Angeles, Calif.

Application December 12, 1942, Serial No. 468,800

1 Claim. (Cl. 146—13)

My invention relates to a nut cracker, and has for its principal object to generally improve upon and simplify the existing forms of manually operable nut crackers, and to provide a simple, practical and inexpensive nut cracker having a plurality of pairs of pockets adapted to receive nuts of different sizes and shapes while the same are being cracked.

A further object of my invention is to provide a nut cracker of the character referred to having recesses especially designed to receive English walnuts, while the same are being cracked, and which walnuts, it will be understood, have ribs which project outwardly along the meeting edges of the two parts of the shell.

With the foregoing, and other objects in view, my invention consists in certain novel features of construction and arrangement of parts, which will be hereinafter more fully described and claimed, and illustrated in the accompanying drawing, in which:

Fig. 1 is a plan view of my improved nut cracker.

Fig. 2 is an enlarged longitudinal section taken on the line 2—2 of Fig. 1.

Fig. 3 is a horizontal section taken on the line 3—3 of Fig. 2.

Fig. 4 is an enlarged cross section taken on the line 4—4 of Fig. 1.

Fig. 5 is a cross section taken on the line 5—5 of Fig. 3.

Fig. 6 is a cross section taken on the line 6—6 of Fig. 3.

Fig. 7 is a cross section taken on the line 7—7 of Fig. 3.

Referring by numerals to the accompanying drawing which illustrates a preferred embodiment of my invention, 10 and 11 designate practically identical jaws, the rear ends of which terminate in handles 12.

The forward end of jaw 11 terminates in a disc shaped member 13 which is disposed at right angles to the plane occupied by jaws 10, and said disc is positioned between a pair of similar discs 14 that are formed on the forward end of jaw 11.

Passing through the centers of the discs 13 and 14, is a hinge or pivot pin 15 which forms an axis upon which the jaws swing.

The diameter of disc 13 is slightly less than that of the discs 14, and passing around the forward portion of disc 13, between the adjacent edges of the discs 14, is a bow spring 16, the ends of which are suitably secured preferably by means of screws 17 to the outer faces of the jaws 10 and 11 adjacent the discs 13 and 14.

For the protection of the spring to prevent its striking extraneous objects, and becoming broken or detached, the curved intermediate portion of said spring occupies the recess between the fortical ward portion of disc 13 and the projecting edges of discs 14 as illustrated in Figs. 2 and 3, and the ends of said spring which receive the screws 17 are countersunk in the outer faces of the jaws so that their outer faces lie flush with the outer faces of the jaws.

The jaws 10 and 11 between the discs 13 and 14 and handles 12 are increased somewhat in width, and these widened portions are provided with flat underfaces.

Formed in the flat faces of said jaws adjacent the pivoted ends thereof are shallow substantially circular recesses 18 which are adapted to receive the smaller species of nuts, for instance, hazel nuts, filberts, and the smaller varieties of hickory nuts.

Formed in the flat faces of the jaws immediately adjacent the recesses 18 are transversely disposed recesses 19 of oval shape, and which are especially designed to receive elongated nuts, such as pecans.

Formed in the flat faces of the jaws immediately adjacent said recesses 19 are transversely disposed oval shaped recesses 20 of such size as to receive English walnuts.

Inasmuch as the shells of English walnuts are provided along their meeting edges with continuous outwardly presented ribs, there are formed in the jaws, grooves or channels 21, which are disposed centrally and lengthwise of the recesses 20. Thus, when English walnuts are placed in the recesses 20, the longitudinally disposed rib occupies the groove 21 or channel 21, thus firmly holding the engaged nut and preventing any slippage thereof, while the same is being cracked.

Portions of the flat surfaces of the jaws adjacent the recesses 20 may be slightly depressed and provided with crossed ribs such as 22 in order to firmly engage the shells of irregular shaped nuts, such as Brazil nuts, or for engaging broken portions of the shells of large nuts when it is further desired to further break the same.

Normally the spring 16 maintains the jaws apart, as illustrated in Fig. 2, and the nuts to be cracked are placed in the proper recess in the lower one of the jaws, and the handles are now manually moved toward each other with sufficient pressure to break the nut or nuts between the jaws.

When the handles are relieved of manual pressure, spring 16 spring said jaws parts, thus permitting the ready removal of the cracked nuts.

Thus, it will be seen that I have provided a nut cracker that is relatively simple in construction, inexpensive of manufacture, and very effective in performing the functions for which it is intended. It will be understood that minor changes in the size, form and construction of the various parts of my improved nut cracker may be made and substituted for those herein shown and described, without departing from the spirit of my invention, the scope of which is set forth in the appended claim.

I claim as my invention:

A nut cracker comprising a pair of identical jaws, a handle projecting from the rear end of each jaw, the forward ends of which jaws are pivotally connected directly to each other, a spring passing around the pivoted end of the jaws with the ends of said spring connected to the jaws rearwardly from the point of pivoted connection and each jaw comprising a wide plate having a flat inner face in which is formed a circular recess, an oval recess, a larger oval recess in the bottom of which is formed a longitudinally disposed groove and with an oval recess having a roughened surface.

JOHN JACKSON.